United States Patent
Ochi et al.

(10) Patent No.: US 7,521,099 B2
(45) Date of Patent: Apr. 21, 2009

(54) LIQUID CRYSTAL SEALING MATERIAL AND LIQUID CRYSTAL DISPLAY CELL USING SAME

(75) Inventors: Naoyuki Ochi, Saitama (JP); Toyohumi Asano, Saitama (JP); Masahiro Imaizumi, Kita-ku (JP); Masaru Kudou, Saitama (JP); Eiichi Nishihara, Kita-ku (JP); Masahiro Hirano, Ageo (JP); Kouta Yoshii, Saitama (JP); Sumio Itimura, Kita-ku (JP); Makiko Kogo, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/661,796

(22) PCT Filed: Aug. 31, 2005

(86) PCT No.: PCT/JP2005/015893

§ 371 (c)(1),
(2), (4) Date: Apr. 9, 2007

(87) PCT Pub. No.: WO2006/027982

PCT Pub. Date: Mar. 16, 2006

(65) Prior Publication Data

US 2007/0258033 A1 Nov. 8, 2007

(30) Foreign Application Priority Data

Sep. 6, 2004 (JP) ............................. 2004-258062

(51) Int. Cl.
*C09K 3/10* (2006.01)
*G02F 1/1339* (2006.01)

(52) U.S. Cl. ..................... 428/1.5; 428/1.1; 349/153; 349/190

(58) Field of Classification Search .................. 428/1.1, 428/1.5; 349/153, 190
See application file for complete search history.

(56) References Cited

U.S. PATENT DOCUMENTS

| | | | | |
|---|---|---|---|---|
| 5,898,041 | A | 4/1999 | Yamada et al. | ................. 522/81 |
| 6,001,203 | A | 12/1999 | Yamada et al. | .............. 156/106 |
| 6,013,339 | A | 1/2000 | Yamada et al. | .................. 428/1 |
| 2003/0147034 | A1 | 8/2003 | Kojima | ........................ 349/153 |
| 2004/0263763 | A1 | 12/2004 | Kojima | ........................ 349/153 |
| 2005/0231679 | A1 | 10/2005 | Kojima | ........................ 349/153 |
| 2006/0240198 | A1* | 10/2006 | Tanikawa et al. | ........... 428/1.53 |

FOREIGN PATENT DOCUMENTS

| | | |
|---|---|---|
| JP | 63-179323 | 7/1988 |
| JP | 1-243029 | 9/1989 |
| JP | 9-5759 | 1/1997 |
| JP | 10-239694 | 9/1998 |
| JP | 2001-89743 | 4/2001 |
| JP | 2001-133794 | 5/2001 |
| JP | 2001-142086 | 5/2001 |
| JP | 2001-311953 | 11/2001 |
| JP | 2002-317172 | 10/2002 |
| JP | 2004-61925 | 2/2004 |
| JP | 2004-163763 | 6/2004 |
| WO | 03/010602 | 2/2003 |
| WO | WO 2004/108790 | * 12/2004 |

OTHER PUBLICATIONS

The International Search Report dated Nov. 22, 2005.
The European communication dated Oct. 10, 2008.
* cited by examiner

*Primary Examiner*—Shean C Wu
(74) *Attorney, Agent, or Firm*—Nields, Lemack & Frame, LLC

(57) ABSTRACT

To provide a photopolymerization initiator having an extremely low possibility of contaminating liquid crystals, and a liquid crystal sealing material using such a photopolymerization initiator.

A liquid crystal sealing material comprising (a) a reactive photopolymerization initiator represented by the general formula (1) and (b) a photocurable resin:

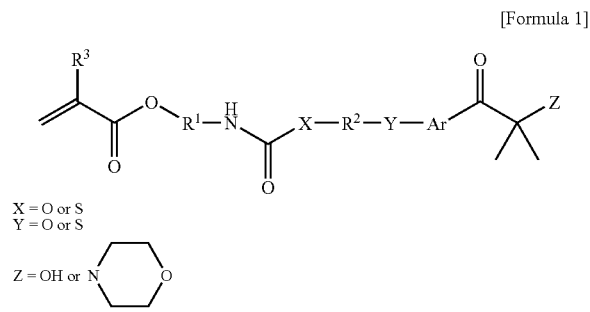

[Formula 1]

$X = O$ or $S$
$Y = O$ or $S$
$Z = OH$ or morpholino (wherein $R_1$ represents a divalent straight chain, branched or cyclic lower alkylene group having 1 to 10 carbon atoms or an arylene group; $R_2$ represents a divalent straight chain, branched or cyclic lower alkylene group having 1 to 10 carbon atoms or an arylene group; Ar represents an arylene group; $R_3$ represents a hydrogen atom or a methyl group; X and Y respectively represent O or S; and Z is a hydroxyl group or a morpholino group).

24 Claims, No Drawings

LIQUID CRYSTAL SEALING MATERIAL AND LIQUID CRYSTAL DISPLAY CELL USING SAME

TECHNICAL FIELD

The present invention relates to a liquid crystal sealing material and a liquid crystal display cell using the same. More particularly, the present invention relates to a liquid crystal sealing material for use in manufacture of a liquid crystal display cell in which a liquid crystal is sealed by dropping the liquid crystal inside the wall of a combined photo- and heat-curable liquid crystal sealing material formed on one substrate, thereafter laminating the other substrate thereon and curing the liquid crystal sealing material, and to a liquid crystal display cell manufactured using the liquid crystal sealing material.

BACKGROUND ART

As a manufacturing method of liquid crystal display cells, the so-called liquid crystal dropping process, which has a high mass productivity, is proposed accompanying the recent years' upsizing of liquid crystal display cells (see Patent Document 1 and Patent Document 2). Specifically, the manufacturing method involves dropping a liquid crystal inside a liquid crystal sealing material formed on one substrate, and thereafter laminating the other substrate thereon to seal the liquid crystal.

However, the liquid crystal dropping process, since a liquid crystal sealing material in an uncured state first contacts with a liquid crystal, has such a problem that components of the liquid crystal sealing material dissolve in the liquid crystal on contacting and the specific resistance value of the liquid crystal decreases, thereby generating display defects in the vicinity of the seal.

As curing methods of a liquid crystal sealing material after a substrate is laminated in the liquid crystal dropping process, there are three methods of heat-curing, photocuring and combined photo- and heat-curing. The heat-curing method has such problems that a liquid crystal leaks from a liquid crystal sealing material rendered low in viscosity during curing due to the expansion of the liquid crystal by heating, and that components of the liquid crystal sealing material rendered low in viscosity dissolve in the liquid crystal. These problems are difficult to solve, so the heat-curing method is not yet in practical use.

On the other hand, liquid crystal sealing materials used in the photocuring method include two kinds of cationic polymerization type and radical polymerization type depending on the kinds of photopolymerization initiators. Since a liquid crystal sealing material of cationic polymerization type (see Patent Document 3) generates ions in photocuring, when it is used in the liquid crystal dropping process, it has such a problem that the ion components elute in the liquid crystal in the contact state and the specific resistance value of the liquid crystal is reduced. Then, since a liquid crystal sealing material of radical polymerization type (see Patent Document 4) has a large curing contraction on photocuring, it has a problem of an insufficient adhesion strength. A problematic point related to both photocuring methods of cationic polymerization type and radical polymerization type involve such a problem that metal wiring parts of an array substrate for liquid crystal display cell and black matrix parts of a color filter substrate generate light-shielded parts of a liquid crystal sealing material where light does not enter, thus causing the light-shielded parts to become uncured.

The heat-curing method and the photocuring method have such various problems, and actually the combined photo- and heat-curing method is believed to be the most practical method (see Patent Document 5). The combined photo- and heat-curing method is characterized in that a liquid crystal sealing material interposed between substrates is irradiated with light to be primarily cured, and is thereafter heated to be secondarily cured. The important characteristics required for a liquid crystal sealing material used in the combined photo- and heat-curing method involve that the liquid crystal sealing material does not contaminate a liquid crystal in every process before and after light irradiation and before and after heat-curing, and especially coutermeasures for the light-shielded parts described before, namely, countermeasures against the elution of the sealing material components from the parts of the sealing material which have not be photocured into the liquid crystal on heat-curing are required. As solving methods, the following are conceived;, (1) curing rapidly at a low-temperature before sealing material components elute out, (2) constituting components of a sealing material which hardly elute in a liquid crystal composition, and the like. Of course, the rapid curing at low-temperature accompanies worsening of the pot life during use, which is a practically big problem. Therefore, to obtain a liquid crystal sealing material which has a long pot life and exhibits a low contamination of a liquid crystal, the liquid crystal sealing material is required to be constituted of components which hardly elute in a liquid crystal composition.

However, photopolymerization initiators such as an acetophenone initiator, a benzoin initiator and a benzophenone initiator have such problems that they easily elute in a liquid crystal, and further decrease the specific resistance value of the liquid crystal when they contact with the liquid crystal.

Patent Document 6 describes a photopolymerization initiator. The described photopolymerization initiator is conceived to decrease the elution during the heating process because the initiator is captured in the cured material after photopolymerization since the initiator has both a photoreactive group (acryloyl group) and a photoinitiation site in the molecule. Considering from the structure, the initiator is supposed to be synthesized by a successive addition reaction or simultaneous addition reaction using three components of IPDI (isophorone diisocyanate), 2-hydroxy-4'-hydroxyethoxy-2-methylpropiophenone and HEA (2-hydroxyacrylate) as raw material compounds. However, it is hardly considered that the structural formula described in said patent document generates photoradicals. Besides, since the initiator is a three-component synthesized product, a problem of the contamination into liquid crystal still remains to be solved due to large amounts of by-products and residual raw material components. Further, the isolation and purification of the target compound is predicted to be costly and industrially difficult.

Patent Document 7 also describes a photopolymerization initiator. However, this initiator also is based on the similar concept and is a three-component synthesized product. Therefore, problems of the contamination into liquid crystal owing to by-products and residual raw material components and of the difficulty in the isolation and purification still remain to be solved.

As described above, there is still no satisfying photopolymerization initiator for the application to liquid crystal sealing materials of combined photo- and heat-curing type for the use in the liquid crystal dropping process in view of the liquid crystal contamination.

[Patent Document 1]: Japanese Patent Application Laying Open (KOKAI) No. 63-179323
[Patent Document 2]: Japanese Patent Application Laying Open (KOKAI) No. 10-239694
[Patent Document 3]: Japanese Patent Application Laying Open (KOKAI) No. 2001-89743
[Patent Document 4]: Japanese Patent Application Laying Open (KOKAI) No. 01-243029
[Patent Document 5]: Japanese Patent No. 2846842
[Patent Document 6]: Japanese Patent Application Laying Open (KOKAI) No. 2001-133794
[Patent Document 7]: Japanese Patent Application Laying Open (KOKAI) No. 2004-163763

DISCLOSURE OF INVENTION

Problems to be Solved by the Invention

The present invention relates to a liquid crystal sealing material for use in the liquid crystal dropping process in which a liquid crystal display cell is manufactured by dropping a liquid crystal inside the wall of the liquid crystal sealing material formed on the periphery of one substrate, thereafter laminating the other substrate thereon, irradiating the liquid crystal sealing part with light and then heat-curing the sealing part, and proposes a liquid crystal sealing material which exhibits a remarkably low contamination into a liquid crystal through processes, and is excellent in workability of application to substrates, laminability and adhesion strength.

Means to Solve the Problems

As a result of extensive studies to solve the problems described hereinbefore, the present inventors have achieved the present invention. Specifically, the present invention relates to:

(1) a liquid crystal sealing material comprising (a) a reactive photopolymerization initiator represented by the general formula (1) and (b) a photocurable resin:

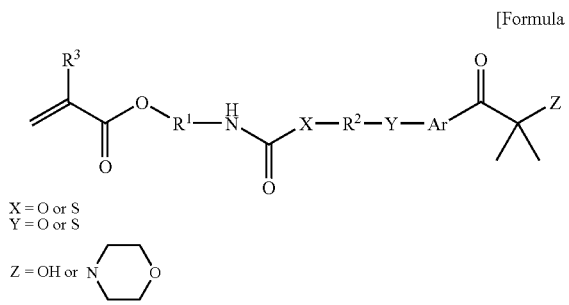

[Formula 1]

X = O or S
Y = O or S
Z = OH or (morpholino)

(wherein, $R^1$ represents a divalent straight chain, branched or cyclic lower alkylene group having 1 to 10 carbon atoms or an arylene group; $R^2$ represents a divalent straight chain, branched or cyclic lower alkylene group having 1 to 10 carbon atoms or an arylene group; Ar represents an arylene group; $R^3$ represents a hydrogen atom or a methyl group; X and Y respectively represent O or S; and Z is a hydroxyl group or a morpholino group);

(2) the liquid crystal sealing material according to (1), wherein $R^1$ in the general formula (1) is an ethylene group;
(3) the liquid crystal sealing material according to (1) or (2), wherein $R^2$ in the general formula (1) is an ethylene group, and Ar is a phenylene group;
(4) the liquid crystal sealing material according to any one of (1) to (3), wherein the reactive photopolymerization initiator has a content of 0.5 wt. % to 20 wt. % based on the whole liquid crystal sealing material;
(5) the liquid crystal sealing material according to any one of (1) to (4), wherein the photocurable resin (b) is an epoxy (meth)acrylate resin;
(6) the liquid crystal sealing material according to any one of (1) to (5), further containing (c) an inorganic filler;
(7) the liquid crystal sealing material according to any one of (1) to (6), further containing (d) an epoxy resin and (e) a heat-curing agent;
(8) the liquid crystal sealing material according to (7), wherein the heat-curing agent (e) is a dihydrazide;
(9) the liquid crystal sealing material according to any one of (1) to (8), further containing (f) a silane coupling agent;
(10) the liquid crystal sealing material according to (9), wherein the silane coupling agent (f) has an amino group;
(11) a liquid crystal display cell sealed by a cured material obtainable by curing a liquid crystal sealing material according to any one of (1) to (10); and
(12) a method for manufacturing a liquid crystal display cell characterized by dropping a liquid crystal inside a wall of a liquid crystal sealing material according to any one of (1) to (10) formed on one substrate and thereafter laminating the other substrate thereon.

Effects of the Invention

The reactive photopolymerization initiator used in the present invention is confirmed to be an initiator exhibiting a remarkably low possibility of contaminating liquid crystals and enhancing the reliability of the sealing material. Further, the use of the liquid crystal sealing material of the present invention which is remarkably excellent in the low possibility of contaminating liquid crystal allows the manufacture of a liquid crystal display cell which is excellent in reliability.

BEST MODE FOR CARRYING OUT THE INVENTION

Hereinafter, the present invention will be in detail described.

A reactive photopolymerization initiator (a) represented by the general formula (1) in the present invention is obtainable by reacting a (meth)acrylate monomer having an isocyanate group represented by the general formula (2):

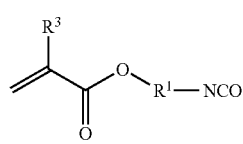

[Formula 2]

(wherein, $R^1$ represents a divalent straight chain, branched or cyclic lower alkylene group having 1 to 10 carbon atoms or an arylene group; and $R^3$ represents a hydrogen atom or a methyl group)

with an aryloyl compound having a hydroxy group or a thiol group represented by the general formula (3):

[Formula 3]

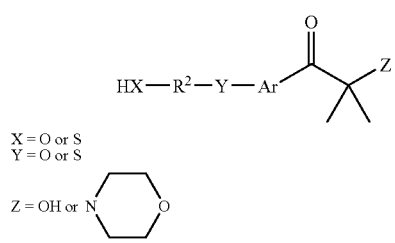

X = O or S
Y = O or S

Z = OH or N⟨  ⟩O (wherein, R² represents a divalent straight chain, branched or cyclic lower alkylene group having 1 to 10 carbon atoms or an arylene group; Ar is an arylene group; X and Y respectively represent O or S; and Z is a hydroxyl group or a morpholino group).

A radically reactive (meth)acrylate monomer having an isocyanate group represented by the general formula (2) is not especially limited as long as it has a structure having an isocyanate group which reacts with a hydroxy group or a thiol group and together a radically polymerizable group in the molecule. A lower alkylene group as R¹ represents a straight chain, branched or cyclic, substituted or unsubstituted, saturated or unsaturated hydrocarbon having 1 to 10 carbon atoms, preferably a straight chain or branched alkylene group having 1 to 10 carbon atoms such as an ethylene group, propyrene group or butylene group. 2-isocyanateethyl methacrylate, which has an ethylene group is especially preferable.

An aryloyl compound (a photopolymerization initiator having no reactive group) having a hydroxy group or a thiol group represented by the general formula (3) is not especially limited as long as the aryloyl compound has in the molecule a hydroxy group or a thiol group which react with an isocyanate group. A lower alkylene group as R² represents a straight chain, branched or cyclic, substituted or unsubstituted, saturated or unsaturated hydrocarbon having 1 to 10 carbon atoms. A straight chain or branched alkylene group having 1 to 10 carbon atoms such as an ethylene group, propyrene group or butylene group are preferable; and an arylene group includes a phenylene group, naphthylene group, biphenylene group, pyrrolylene group and thienylene group. An especially preferable one is 2-hydroxy-4'-hydroxyethoxy-2-methylpropyophenone, 1-[4-[(2-hydroxyethyl)-thio]phenyl]-2-methyl-2-(4-morpholino)-1-propanone or 1-[4-(2-mercaptoethyl)-thio]phenyl]-2-methyl-2-(4-morpholino)-1-propanone, which has an ethylene group as R² and a phenylene group as Ar.

These two kinds of compounds are condensation-reacted by heat of 70 to 100° C. to obtain a targeted reactive photopolymerization initiator (a). The amounts of both compounds used in the reaction are such that the amount of a compound represented by the general formula (3) is set to be about 0.9 to 1.1 mol based on 1.0 mol of a compound represented by the general formula (2). During this reaction, a solvent may optionally be used.

Since a reactive photopolymerization initiator synthesized by this method has a radically polymerizable reactive group together with a radical generating group, the initiator also crosslinks due to the presence of a reactive group and contributes to the curing reaction. Therefore, the reactive photopolymerization initiator hardly elutes even in a liquid crystal which is very sensitive to unreacted impurities, does not cause defects in the liquid crystal alignment, and can maintain the reliability of panels. Further, since the reactive photopolymerization initiator is a product produced by reacting a radically reactive (meth)acrylate monomer having an isocyanate group represented by the general formula (2) with an aryloyl compound having a hydroxy group or a thiol group represented by the general formula (3) in the ratio of 1:1, neither impurities nor isomers are generated. Therefore, said initiator is a more reliable material in view of the possibility of contaminating liquid crystal.

In the liquid crystal sealing material of the present invention, the content of component (a), which is a reactive photopolymerization initiator, is preferably 0.5 wt. % to 20 wt. %, especially preferably 2 wt. % to 10 wt. %. When the amount of the reactive photopolymerization initiator is less than 2 wt. %, the photocuring reaction sometimes cannot sufficiently progress. On the other hand, when that exceeds 20 wt. %, too much the initiator sometimes may cause problems of the contamination of the initiator into the liquid crystal and the decrease in the cured resin characteristics.

A photocurable resin (b) used in the present invention is not especially limited as long as the elution thereof into a liquid crystal is low, but an epoxy (meth)acrylate resin is especially preferable in view of the contamination into the liquid crysal. The epoxy acrylate resin or epoxy methacrylate resin (b) component is obtainable by esterifying an epoxy resin having at least two epoxy groups in the molecule with acrylic acid or methacrylic acid. This synthetic reaction can be performed by commonly known methods. For example, an epoxy resin is esterified with the equivalent weight ratio of acrylic acid or methacrylic acid, for example, at 80 to 110° C. under the presence of a catalyst (e.g., benzyldimethylamine, triethylamine, benzyltrimethylammonium chloride, triphenylphosphine and triphenylstibine) and a polymerization inhibitor (e.g., metoquinone, hydroquinone, methylhydroquinone, phenothiazine and dibutylhydroxytoluene). Epoxy resins having at least two epoxy groups in the molecule include, for example, bisphenol A epoxy resin, alkyl-substituted bisphenol A epoxy resin, alkylene oxide-added bisphenol A epoxy resin, bisphenol F epoxy resin, alkyl-substituted bisphenol F, epoxy resin, alkylene oxide-added bisphenol F epoxy resin, bisphenol S epoxy resin, alkyl-substituted bisphenol S epoxy resin, alkylene oxide-added bisphenol S epoxy resin, phenol novolac epoxy resin, cresol novolac epoxy resin, biphenyl epoxy resin, naphthalene epoxy resin, glycidylamine epoxy resin, dicyclopentadiene epoxy resin, silicone-modified epoxy resin, urethane-modified epoxy resin and rubber-modified epoxy resin. Bisphenol A epoxy resin, alkyl-substituted bisphenol A epoxy resin, alkylene oxide-added bisphenol A epoxy resin, bisphenol F epoxy resin, alkyl-substituted bisphenol F epoxy resin, alkylene oxide-added bisphenol F epoxy resin, bisphenol S epoxy resin, alkyl-substituted bisphenol S epoxy resin and alkylene oxide-added bisphenol S epoxy resin are preferable.

In the present invention, the content of a photocurable resin (b) in a liquid crystal sealing material is preferably about 20 wt. % to 80 wt. %.

Inorganic fillers (c) usable in the present invention include fused silica, crystalline silica, silicon carbide, silicon nitride, boron nitride, calcium carbonate, magnesium carbonate, barium sulfate, calcium sulfate, mica, talc, clay, alumina, magnesium oxide, zirconium oxide, aluminum hydroxide, magnesium hydroxide, calcium silicate, aluminum silicate, lithium aluminum silicate, zirconium silicate, barium titanate, glass fiber, carbon fiber, molybdenum disulfide and asbestos. Fused silica, crystalline silica, silicon nitride, boron nitride, calcium carbonate, barium sulfate, calcium sulfate, mica, talc, clay, alumina, aluminum hydroxide, calcium silicate and aluminum silicate and are preferable. and fused silica, crystalline silica, alumina and talc are further preferable. These inorganic fillers may be used in a mixture of two or more.

The content of an inorganic filler usable for the present invention in a liquid crystal sealing material is commonly 5 to 40 wt. %, preferably 15 to 25 wt. %. When the content of an inorganic filler is less than 5 wt. %, since the adhesion strength to a glass substrate decreases, and the moisture resistance reliability is inferior, the adhesion strength after moisture absorption sometimes decreases largely. On the other hand, when the content exceeds 40 wt. %, it becomes hard to make the sealing material compressed and the gap of a liquid crystal cell cannot be formed due to too high content of the inorganic filler.

An epoxy resin (d) usable in the present invention is not especially limited, but an epoxy resin which hardly elutes in a liquid crystal is preferable in view of the possibility of contaminating the liquid crystal. Such an epoxy resin includes, but are not limited to, for example, bisphenol S epoxy resin (formula 4):

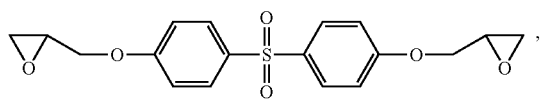

a resorcin diglycidyl ether multimer (formula 5):

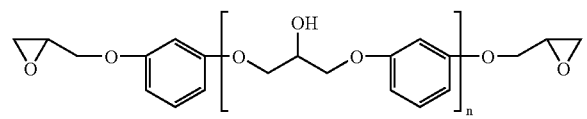

(wherein, n represents an integer of 1 to 10), a diglycidyl ether of ethylene oxide-added bisphenol S (formula 6):

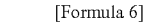

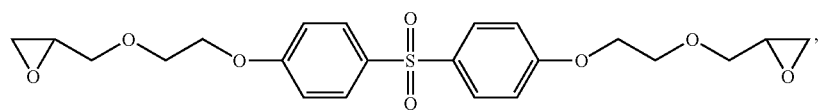

and a diglycidyl ether of ethylene oxide-added bisphenol fluorene (formula 7):

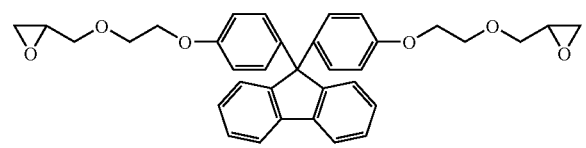

The amount of hydrolyzable chlorine of an epoxy resin used in the present invention is preferably not more than 600 ppm, further preferably not more than 300 ppm. When the amount of hydrolyzable chlorine is more than 600 ppm, a problem of the contamination of liquid crystal sealing material into a liquid crystal sometimes occurs. The amount of hydrolyzable chlorine is quantified, for example, by dissolving about 0.5 g of an epoxy resin in 20 ml of dioxane, refluxing for 30 min with 5 ml of a 1-N KOH/ethanol solution and thereafter titrating with a 0.01-N silver nitrate solution.

The content of such an epoxy resin (d) in a liquid crystal sealing material is preferably about 5 wt. % to 50 wt. %.

The liquid crystal sealing material of the present invention preferably contains a heat-curing agent (e). The heat-curing agent is not especially limited as long as it reacts with an epoxy resin to form a cured material, but it is important that the curing agent starts to react homogeneously and rapidly on heating, keeping a sealing material from contaminating a liquid crystal, and exhibits little time-dependent change of viscosity at room temperature during use. The liquid crystal sealing material is required to cure at low temperature such as 120° C. for 1 h in order to minimize the decrease in the characteristics of a liquid crystal to be enclosed. In view of above points, as a heat-curing component in the liquid crystal sealing material of the present invention, the use of polyfunctional hydrazides and polyvalent amines is especially preferable.

Polyfunctional hydrazides mean ones which have two or more hydrazide groups in the molecule. Specific examples include, but are not limited to, carbohydrazide, oxalic dihydrazide, malonic dihydrazide, succinic dihydrazide, adipic dihydrazide, pimelic dihydrazide, suberic dihydrazide, azelaic dihydrazide, sebacic dihydrazide, dodecanedioic dihydrazide, hexadecanedioic hydrazide, maleic dihydrazide, fumaric dihydrazide, diglycolic dihydrazide, tartaric dihydrazide, malic dihydrazide, isophthlic dihydrazide, terephthalic dihydrazide, 2,6-naphthoic dihydrazide, 4,4-bisbenzene dihydrazide, 1,4-naphthoic dihydrazide, 2,6-pyridine dihydrazide, 1,2,4-benzene trihydrazide, pyromellitic tetrahydrazide, 1,4,5,8-naphthoic tetrahydrazide and hydrazides having a valinehydantoin skeleton such as 1,3-bis (hydrazinocarbonoethyl)-5-isopropyl hydantoin. When a polyfunctional dihydrazide is used as a curing agent, it is preferable to make it into fine particle size and disperse it homogeneously in order to use it as a latent curing agent. Of polyfunctional dihydrazides, dihydrazide is preferable. Especially adipic dihydazide, isophthalic dihydrazide and dihydrazides having a valinehydantoin skeleton are preferable in view of the contamination into liquid crystal. The average particle size is preferably not more than 3 µm, further preferably not more than 2 µm, since too large an average particle size causes such faults that a gap cannot be formed well when an upper and lower glass substrates are laminated in the manufacture of a liquid crystal cell with a thin gap. Similarly, the maximum particle size is preferably not more than 8 µm, more preferably not more than 5 µm. The particle size of curing agents was measured by a laser diffraction-scattering particle size distribution measuring instrument (dry type) (LMS-30, manufactured by Seishin Enterprise Co., Ltd.). The average particle size is preferably controlled so as not to become extremely small (e.g., not more than 0.1 μm).

On the other hand, polyvalent amines include diaminodiphenylmethane, diaminodiphenylsulfone and diaminodiphenyl ether.

The formulation ratio of a component (e) in a liquid crystal sealing material of the present invention is preferably 0.8 to 1.5 equivalent based on the equivalent weight of the epoxy group of a component (d), further preferably 0.9 to 1.2 equivalent. When the amount of the component (d) is less than 0.8 equivalent, the heat-curing reaction does not proceed sufficiently, and the adhesive strength and glass transition temperature are sometimes lowered. On the other hand, the equivalent weight exceeds 1.5, the curing agent remains, the adhesive strength decreases, and the pot life sometimes deteriorates.

The liquid crystal sealing material of the present invention preferably contains a silane coupling agent (f) in order to improve the adhesive strength. Silane coupling agents include, for example, 3-glycidoxypropyltrimethoxysilane, 3-glycidoxypropylmethyldimetoxysilane, 3-glycidoxypropylmethyldimethoxysilane, 2-(3,4-epoxycyclohexyl)ethyltrimethoxysilane, N-phenyl-γ-aminopropyltrimethoxysilane, N-(2-aminoethyl)3-aminopropylmethyldimethoxysilane, N-(2-aminoethyl)3-aminopropylmethyltrimethoxysilane, 3-aminopropyltriethoxysilane, 3-mercaptopropyltrimethoxysilane, vinyltrimethoxysilane, N-(2-(vinylbenzylamino)ethyl)3-aminopropyltrimethoxysilane hydrochloride, 3-methacryloxypropyltrimetoxysilane, 3-chloropropylmethyldimethoxysilane and 3-chloropropyltrimethoxysilane. These silane coupling agents may be used in a mixture of two or more. Of these silane coupling agents, ones having an amino group are preferable for obtaining a better adhesive strength. The use of a silane coupling agent improves the adhesive strength and provides a liquid crystal sealing material which is excellent in the moisture resistance reliability.

The content of the silane coupling agent (f) in a liquid crystal sealing material is preferably about 0.01 wt. % to 1 wt. %.

The liquid crystal sealing material of the present invention may further optionally comprises an organic solvent, organic filler, inorganic filler and additives such as a pigment, leveling agent and defoaming agent.

One of the methods for obtaining a liquid crystal sealing material of the present invention involves, at first, dissolving and mixing a component (a), a component (b) and optionally a component (d) and a component (f). Then, an inorganic filler component (c), and further a component (e) as a heat-curing agent in case the component (d) is used, and optionally an organic filler, a defoaming agent, a leveling agent, etc. in prescribed amounts are added to the mixture, and the mixing by a commonly known mixing machine, such as a triaxial roll, sand mill or ball mill homogeneously gives a liquid crystal sealing material of the present invention.

The liquid crystal display cell of the present invention has a pair of substrates oppositely arranged with a prescribed gap on which prescribed electrodes are formed, and the peripheries of the substrates are sealed with the liquid crystal sealing material of the present invention, and a liquid crystal is enclosed in the gap. The kind of the enclosed liquid crystal is not especially limited. Herein, the substrates are constituted of a combination of substrates, at least one of which has light transparency, such as a glass, quartz, plastic or silicon. The manufacturing method involves, for example, adding spacers (gap controlling material) such as glass fiber to a liquid crystal sealing material of the present invention, then applying the liquid crystal sealing material on the periphery of one of the pairs of substrates by a dispenser, etc., dropping a liquid crystal inside of the wall of the liquid crystal sealing material, overlapping the other glass substrate thereon under vacuum, and adjusting the gap. After forming the gap, the liquid crystal sealing part is irradiated with ultraviolet rays by an ultraviolet irradiation device to photocure the liquid crystal sealing part. The ultraviolet irradiation amount is preferably 500 mJ/cm² to 6,000 mJ/cm², more preferably 1,000 mJ/cm² to 4,000 mJ/cm². Thereafter, the curing at 90 to 130° C. for 1 to 2 h gives a liquid crystal display cell of the present invention. The liquid crystal display cell of the present invention thus obtained has no display defects by the contamination into the liquid crystal and excels in the adhesiveness and the moisture resistance reliability. The spacer includes, for example, glass fiber, silica bead and polymer bead. The diameter thereof is different depending on objects, and generally 2 to 8 μm, preferably 4 to 7 μm. The amount used is preferably generally 0.1 to 4 pts.wt. based on 100 pts.wt. of the liquid crystal sealing material of the present invention, further preferably 0.5 to 2 pts.wt., most preferably about 0.9 to 1.5 pts.wt.

EXAMPLES

The following Examples further describe the present invention in detail.

Synthesis Example 1

(a) Synthesis 1 of a Reactive Photopolymerization Initiator 155 g of 2-isocyanateethyl methacrylate (Karenz MOI, manufactured by Showa Denko KK) as a radically reactive (meth)acrylate monomer having an isocyanate group and 224 g of 2-hydroxy-4'-hydroxyethoxy-2-methylpropiophenone (IRG-2959, manufactured by Chiba Speciality Chemicals Corp.) as an aryloyl compound having a hydroxy group were put in a reaction vessel, and 0.76 g of methylhydroquinone as a polymerization inhibitor was added thereto. The temperature of the mixture was raised to 80° C., and the mixture was stirred for about 26 h at said temperature. The obtained reaction solution was dissolved in a mixture solvent of methyl isobutyl ketone and toluene, and washed with water. Thereafter, methyl isobutyl ketone and toluene were distilled out, and a targeted reactive photopolymerization initiator represented by the following structural formula:

[Formula 8]

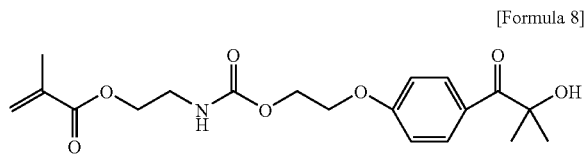

was obtained by recrystallization using ethyl acetate and n-hexane.

Synthesis Example 2

(a) Synthesis 2 of a Reactive Photopolymerization Initiator 155 g of 2-isocyanateethyl methacrylate (Karenz MOI, manufactured by Showa Denko KK) as a radically reactive (meth)acrylate monomer having an isocyanate group and 325 g of 1-[4-[2-(-mercaptoethyl)-thio]phenyl]-2-methyl-2-(4-morpholino)-1-propanone (CGI967, manufactured by Chiba Speciality Chemicals Corp.) as an aryloyl compound having a thiol group were put in a reaction vessel, and dissolved in 320 g of toluene; and 0.96 g of methylhydroquinone as a polymerization inhibitor was added thereto. The temperature of the mixture was raised to 80° C., and the mixture was stirred for about 32 h at said temperature. The obtained reaction solution was dissolved in a mixture solvent of methyl isobutyl ketone and toluene, and washed with water. Thereafter, methyl isobutyl ketone and toluene were distilled out to obtain a targeted reactive photopolymerization initiator represented by the following structural formula:

[Formula 9]

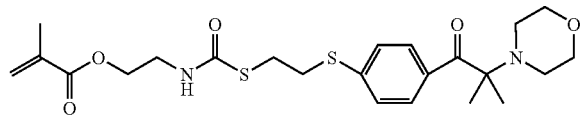

Comparative Synthesis Example 1

Synthesis of a Reactive Photopolymerization Initiator of Patent Document 6

58 g of 2-hydroxyethyl acrylate (HEA, manufactured by Osaka Organic Chemical Industry Ltd.) as a radically reactive acrylate monomer and 84 g of isophorone diisocyanate (IPDI, manufactured by Nippon Polyurethane Industry Co., Ltd.) as a diisocyanate were put in a reaction vessel, and 0.51 g of methylhydroquinone as a polymerization inhibitor was added thereto. The temperature of the mixture was raised to 80° C., and the mixture was stirred for about 12 h at said temperature. The obtained reaction solution was added with 112 g of 2-hydroxy-4'-hydroxyethoxy-2-methylpropiophenone (IRG-2959, manufactured by Chiba Speciality Chemicals Corp.) as an aryloyl compound having a hydroxy group; and the temperature of the solution was raised to 80° C., and the solution was stirred for about 26 h at said temperature. The obtained reaction solution was dissolved in a mixture solvent of methyl isobutyl ketone and toluene, and washed with water. Thereafter, methyl isobutyl ketone and toluene were distilled out to obtain a reactive photopolymerization initiator (KR-02) described in Patent Document 6.

Example 1

7.2 pts.wt. of the reactive photopolymerization initiator synthesized in Synthesis Example 1, 120 pts.wt. of an epoxy acrylate of bisphenol F epoxy resin (YDF-8170C, epoxy equivalent: 160 g/eq, manufactured by Tohto Kasei Co., Ltd.), 30 pts.wt. of RE-203 (ethylene oxide-added bisphenol S epoxy resin, epoxy equivalent: 233 g/eq, manufactured by Nippon Kayaku Co., Ltd.) as an epoxy resin and 0.2 pts.wt. of an aminosilane coupling agent (N-β(aminoethyl)γ-aminopropyltrimethoxysilane, manufactured by Shin-Etsu Silicones Co., Ltd. KBM-603) were heated and dissolved at 90° C. to obtain a resin solution. The resin solution was cooled to room temperature, then added with 10.1 pts.wt. of adipic dihydrazide (trade name: ADH; a jet mill-pulverized grade manufactured by Otsuka Chemical Co., Ltd. was further finely pulverized), 25 pts.wt. of alumina (manufactured by, SPC-A1, average particle size: 1.0 μm) and 5.8 pts.wt. of a rubber (Paraloid EXL-2655, manufactured by Osaka Kasei Co., Ltd., average particle size: μm), and kneaded by a triaxial roll to obtain a liquid crystal sealing material of the present invention. The viscosity (25° C.) of the liquid crystal sealing material was 240 Pa·s (by an R-type viscometer, manufactured by Toki Sangyo Co., Ltd.).

Example 2

A liquid crystal sealing material was obtained as in Example 1, except for using the reactive photopolymerization initiator synthesized in Synthesis Example 2 instead of the reactive photopolymerization initiator synthesized in Synthesis Example 1. The viscosity (25° C.) of the liquid crystal sealing material was 260 Pa·s (by an R-type viscometer, manufactured by Toki Sangyo Co., Ltd.).

Comparative Example 1

A liquid crystal sealing material was obtained as in Example 1, except for using the reactive photopolymerization initiator synthesized in Comparative Synthesis Example 1 instead of the reactive photopolymerization initiator synthesized in Synthesis Example 1. The viscosity (25° C.) of the liquid crystal sealing material was 320 Pa·s (by an R-type viscometer, manufactured by Toki Sangyo Co., Ltd.).

Test for Contamination of a Material into a Liquid Crystal

Four kinds of photopolymerization initiators (the two kinds of photopolymerization initiators synthesized in Synthesis Example 1, Synthesis Example 2 and Comparative Synthesis Example 1 and a commonly used carbazole initiator, 3,6-bis(2-methyl-2-morpholinopropionyl)-9-n-octylcarbazole) were each melted at a temperature near their melting point, and charged in an amount of 0.1 g in a sample bottle; each sample was irradiated at 80° C. with ultraviolet rays of 2,000 mJ/cm$^2$; and 1 ml of a liquid crystal (MLC-6866-100, manufactured by Merck Ltd.) was added to the resultant cured sample, then, charged in an oven at 120° C. for 1 h, and then allowed to stand at room temperature for 0.5 h. The liquid crystal only was taken out from the each sample bottle having been treated, put in Liquid electrode LE21 (manufactured by Ando Electric Co., Ltd.), and measured for the specific resistance value of the liquid crystal on a measurement voltage of 10 V after 4 min by an electrometer R-8340 (manufactured by Advantest Corp.). Eluted substances were also quantified by gas chromatography. The results are shown in Table 1.

Test for Adhesive Strength of Sealing Material 1 g of glass fiber of 5 μm as a spacer is added to 100 g of a liquid crystal sealing material, and mixed and stirred. This liquid crystal sealing material was applied on a glass substrate of 50 mm×50 mm; glass pieces of 1.5 mm×1.5 mm were laminated on the liquid crystal sealing material, followed by the irradiation with ultraviolet rays of 2,000 mJ/cm$^2$ by a UV irradiating device, and then charged in an oven at 120° C. for 1 h and cured. The shearing strength of the glass pieces was measured. The results are shown in Table 2.

Glass Transition Temperature of Sealing Material

The resulatant liquid crystal sealing material was pinched between polyethylene terephthalate (PET) films to give a thin film of 100 μm in thickness; the pinched film was irradiated with ultraviolet rays of 2,000 mJ/cm$^2$, and said thin film was charged in an oven of 120° C. for 1 h and cured; and after curing, the PET films were peeled off to obtain a sample. The glass transition temperature was measured on the tensile mode by a TMA tester (manufactured by Ulvac-Riko, Inc.). The results are shown in Table 2.

As is clear from Table 1, the initiators of Synthesis Example 1 and Synthesis Example 2 of the present invention are demonstrated to have favorable results with respect to both the specific resistance value and the eluted substances; on the other hand, the reactive photopolymerization initiator of Comparative Synthesis Example 1 exhibits a considerable amount of elution of by-products which do not have a photo-reactive group. Further, as shown in Table 2, Example 1 of the present invention has a lower viscosity than Comparative Example 1; so Example 1 excels in handleability such as dispensability, and also in characteristics as a liquid crystal sealing material such as adhesive strength and glass transition temperature.

As described above, it is demonstrated that the initiator of the present provides a remarkably low possibility of contaminating liquid crystal and that the initiator enhances the reliability of the sealing material. Mechanical properties of the sealing material such as adhesive strength and glass transition temperature are not inferior to those of conventional sealing materials, and the initiator is very useful as a photopolymerization initiator for a sealing material for the liquid crystal dropping process.

TABLE 1

|  | Initiator of Synthesis Example 1 | Initiator of Synthesis Example 2 | Initiator of Comparative Synthesis Example 1 | Carbazole initiator |
| --- | --- | --- | --- | --- |
| Contamination-related specific resistance value | 3.09E+12 | 2.22E+12 | 4.21E+11 | 6.30E+9 |
| Elution into liquid crystal | 0.03% | 0.02% | 0.15% | 12% |

TABLE 2

|  | Example 1 | Example 2 | Comparative Example 1 |
| --- | --- | --- | --- |
| Viscosity (25° C.) | 240 Pa · s | 260 Pa · s | 320 Pa · s |
| Adhesive strength | 87 MPa | 83 MPa | 82 MPa |
| Glass transition temperature | 110° C. | 115° C. | 101° C. |

What is claimed is:

1. A liquid crystal sealing material comprising (a) a reactive photopolymerization initiator represented by the general formula (1') and (b) a photocurable resin:

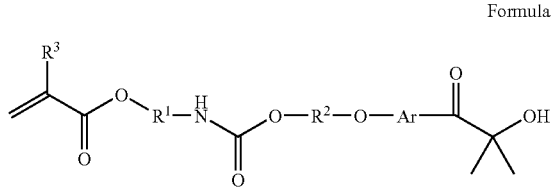

Formula 1'

(wherein $R^1$ represents a divalent straight chain, branched or cyclic lower alkylene group having 1 to 10 carbon atoms or an arylene group; $R^2$ represents a divalent straight chain, branched or cyclic lower alkylene group having 1 to 10 carbon atoms or an arylene group; Ar represents an arylene group; $R^3$ represents a hydrogen atom or a methyl group.

2. The liquid crystal sealing material according to claim 1, wherein $R^1$ in the general formula (1') is an ethylene group.

3. The liquid crystal sealing material according to claim 1, wherein $R^2$ in the general formula (1') is an ethylene group, and Ar is a phenylene group.

4. The liquid crystal sealing material according to claim 1, wherein the reactive photopolymerization initiator has a content of 0.5 wt. % to 20 wt. % based on the whole liquid crystal sealing material.

5. The liquid crystal sealing material according to claim 1, wherein the photocurable resin (b) is an epoxy(meth)acrylate resin.

6. The liquid crystal sealing material according to claim 1, further comprising (c) an inorganic filler.

7. The liquid crystal sealing material according to claim 1, further comprising (d) an epoxy resin and (e) a heat-curing agent.

8. The liquid crystal sealing material according to claim 7, wherein the heat-curing agent (e) is a dihydrazide.

9. The liquid crystal sealing material according to claim 1, further comprising (f) a silane coupling agent.

10. The liquid crystal sealing material according to claim 9, wherein the silane coupling agent (f) has an amino group.

11. A liquid crystal display cell sealed by a cured material obtained by curing a liquid crystal sealing material according to claim 1.

12. A method for manufacturing a liquid crystal display cell characterized by dropping a liquid crystal inside a wall of a liquid crystal sealing material according to claim 1, which is formed on one substrate, followed by laminating the other substrate thereon.

13. A liquid crystal sealing material comprising (a) a reactive photopolymerization initiator represented by the general formula (1) and (b) a photocurable resin:

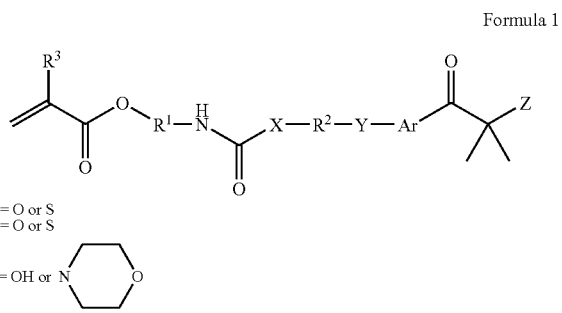

Formula 1

X = O or S
Y = O or S

Z = OH or N⌒O (morpholino)

(wherein $R^1$ represents a divalent straight chain, branched or cyclic lower alkylene group having 1 to 10 carbon atoms or an arylene group; $R^2$ represents a divalent straight chain, branched or cyclic lower alkylene group having 1 to 10 carbon atoms or an arylene group; Ar represents an arylene group; $R^3$ represents a hydrogen atom or a methyl group; X and Y respectively represent O or S; and Z is a hydroxyl group or a morpholino group, with the proviso that when Z is OH, then X and Y are not both O).

14. The liquid crystal sealing material according to claim 13, wherein $R^1$ in the general formula (1) is an ethylene group.

15. The liquid crystal sealing material according to claim 13, wherein $R^2$ in the general formula (1) is an ethylene group, and Ar is a phenylene group.

16. The liquid crystal sealing material according to claim 13, wherein the reactive photopolymerization initiator has a content of 0.5 wt. % to 20 wt. % based on the whole liquid crystal sealing material.

17. The liquid crystal sealing material according to claim 13, wherein the photocurable resin (b) is an epoxy (meth) acrylate resin.

18. The liquid crystal sealing material according to claim 13, further comprising (c) an inorganic filler.

19. The liquid crystal sealing material according to claim 13, further comprising (d) an epoxy resin and (e) a heat-curing agent.

20. The liquid crystal sealing material according to claim 19, wherein the heat-curing agent (e) is a dihydrazide.

21. The liquid crystal sealing material according to claim 13, further comprising (f) a silane coupling agent.

22. The liquid crystal sealing material according to claim 21, wherein the silane coupling agent (f) has an amino group.

23. A liquid crystal display cell sealed by a cured material obtained by curing a liquid crystal sealing material according to claim 13.

24. A method for manufacturing a liquid crystal display cell characterized by dropping a liquid crystal inside a wall of a liquid crystal sealing material according to claim 13, which is formed on one substrate, followed by laminating the other substrate thereon.

* * * * *